United States Patent [19]

Rohrle

[11] 4,127,058

[45] Nov. 28, 1978

[54] LIQUID-COOLED CYLINDER SLEEVES

[75] Inventor: Manfred Rohrle, Nellingen, Germany

[73] Assignee: Mahle GmbH, Stuttgart, Germany

[21] Appl. No.: 778,197

[22] Filed: Mar. 16, 1977

Related U.S. Application Data

[63] Continuation-in-part of Ser. No. 602,577, Aug. 7, 1975, abandoned.

[30] Foreign Application Priority Data

Aug. 13, 1974 [DE] Fed. Rep. of Germany ....... 2438762

[51] Int. Cl.² .............................................. F16J 11/04
[52] U.S. Cl. .................................. 92/169; 123/41.84; 123/193 C
[58] Field of Search ............... 92/169, 171; 123/41.84, 123/193 C

[56] References Cited

U.S. PATENT DOCUMENTS 3,389,693  6/1968  Hershmann et al. .................. 92/171

FOREIGN PATENT DOCUMENTS 1,030,621  5/1958  Fed. Rep. of Germany ............ 92/169

Primary Examiner—Paul E. Maslousky
Attorney, Agent, or Firm—William Anthony Drucker

[57] ABSTRACT

In a liquid-cooled cylinder sleeve for combustion engines of the reciprocating piston type, the provision of a cylinder wall thickness which increases in a rotationally symmetrical manner along its periphery in the direction of the line of intersection of the piston pivoting plane passing through the longitudinal axis of the cylinder and the wall of the cylinder sleeve.

6 Claims, 3 Drawing Figures

LIQUID-COOLED CYLINDER SLEEVES

This is a continuation in part based on U.S. patent application Ser. No. 602,577 now abandoned.

BACKGROUND OF THE INVENTION

1. Field of the Invention

This invention relates to liquid-cooled (so-called cold stored) cylinder sleeves for combustion engines of the reciprocating piston type.

These cylinder sleeves often suffer corrosion on the external surfaces in contact with the cooling liquid, the cavitation processes taking place on the said surfaces being by no means the least important cause thereof. Corrosion of this kind is particularly observable in the zones adjacent to the intersection line between the "piston pivoting plane" passing through the longitudinal axis of the cylinder and the wall of the cylinder sleeve. By "piston pivoting plane" we mean a plane containing the longitudinal axis of the cylinder sleeve disposed at right angles to a plane containing both the longitudinal axis of the cylinder sleeve and the pivoting axis of the piston. These cavitations are caused, at least to a considerable extent, by vibrations of the walls of the cylinder sleeves. As a remedy, therefore, cylinder sleeves have been given comparatively ample wall thicknesses, in order to counteract the harmful vibrations by increased rigidity of the entire cylinder sleeve. In these cases the wall thicknesses often exceed the dimensions which, from the point of view of strength and for the avoidance of vibrations in certain zones of the cylinder sleeve, would have been required to enable the forces acting on the cylinder sleeves to be reliably absorbed. Excessive wall thickness, however, prove disadvantageous, particularly where the dissipation of the heat through the wall of the cylinder sleeve is concerned. For it is precisely from the point of view of good heat transference, of course, that it is desirable to keep the wall thickness to a minimum.

2. Description of the Prior Art

It has already been suggested, in German Specification No. 1,751,296, that a collar provided on the upper edge of the cylinder sleeve and serving to support it should be given varying widths along its periphery. This suggestion, however, is intended as a solution to a problem quite different from that on which the present invention is based. For its purpose is to enable the distance between adjacent cylinders to be kept to a minimum. For this purpose the collars on the cylinders are made narrower at the critical points than on the remainder of their periphery. Care is merely taken to ensure that the total bearing surface of the collar does not fall short of a certain minimum. The sole problem is thus that of making optimum use of the space available in the case of cylinders situated close together. This system, on the other hand, in no way suggests the attempt to which the present invention relates, to influence the dynamic characteristics of the cylinder sleeve by varying wall thicknesses adapted to the force conditions prevailing at different points on the said cylinder sleeve.

SUMMARY OF THE INVENTION

The object of the invention is to enable the wall thickness of the cylinder sleeve, by means of wall shapes in accordance with the actual dynamic conditions occurring in the individual peripheral zones of the cylinder sleeve, to be adapted to the stresses prevailing at each point, thus enabling unnecessary wall thicknesses in certain positions to be avoided.

According to this invention there is provided a liquid-cooled cylinder sleeve for combustion engines of the reciprocating piston type having a cylinder and a piston for reciprocation therein within said sleeve along the longitudnal axis thereof, said piston pivoting in a plane about the axis of a pivot pin at the little end of a connecting rod having two ends, the improvement in which sleeve wall thickness increases in a rotationally symmetrical manner along its periphery towards the line of intersection of the plane of piston pivoting with the wall of said cylinder sleeve.

This system is based on the consideration that the forces acting from the piston on the cylinder sleeve are at the maximum in the "pivoting plane" of the piston, owing to the changes taking place in this position in the direction of the force, while in the plane through the piston pin and the longitudinal axis of the piston they are at the minimum. The fundamental principle of the invention is to adapt the cylinder wall thickness as far as possible to the stresses prevailing at the respective points. In contradistinction to the embodiments hitherto known the cylinder wall thus has thicknesses which vary over the periphery. It is therefore precisely in those zones of the cylinder sleeve which are adjacent to the piston pin lugs that the excessive thickness hitherto prevailing can be avoided. For with the constant wall thickness which has up to now had to be retained over the entire periphery it was necessary to adopt the thickness required at the point of maximum stress, which is situated, as is known, in the zone of the pivoting plane.

The solution adopted not only enables space and material to be saved but is also characterized, mainly from the point of view of satisfactory dissipation of heat, by greatly reduced wall thicknesses at certain points, i.e. in the zone of the piston pin lugs.

DESCRIPTION OF PREFERRED EMBODIMENT

Figure 1:
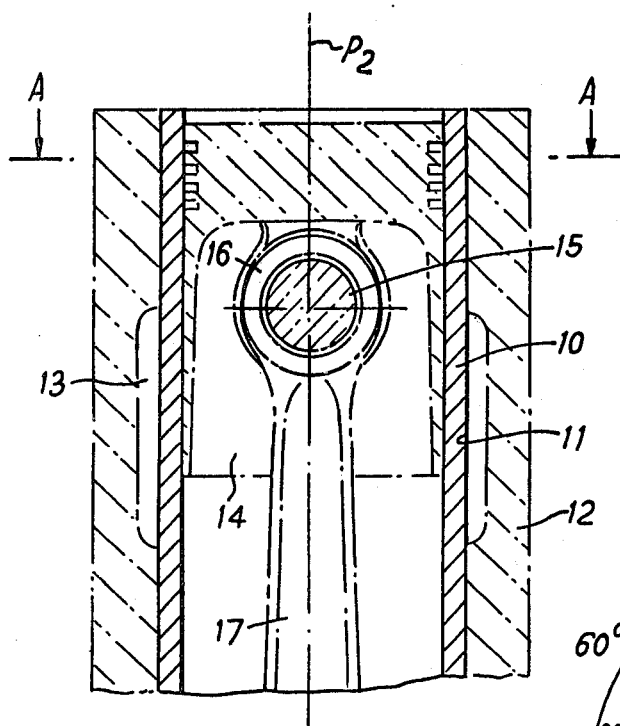
FIG. 1 is a longitudinal section taken along a plane containing the axis of the gudgeon pin of the piston.

The sleeve 10 is located within the bore 11 of a cylinder block 12. Surrounding the sleeve is an annular space 13 for receiving a liquid coolant.

Within the sleeve 10 there is provided the usual piston 14 known per se mounted by means of a gudgeon (pivot) pin 15 on the little end 16 of a connecting rod 17.

Figure 3:
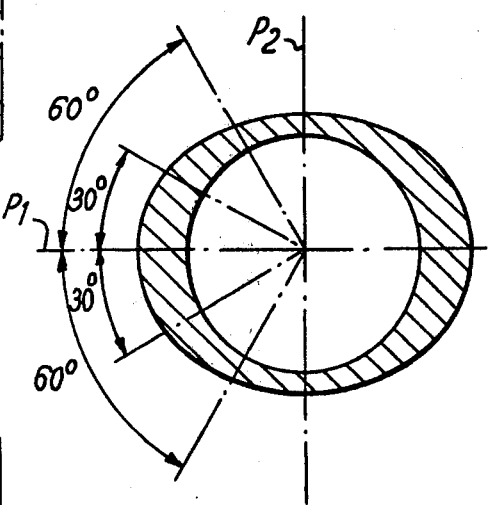
FIG. 3 is a cross-sectional elevation of the sleeve shown in FIG. 2 with the thickened portions thereof exaggerated.
Figure 2:
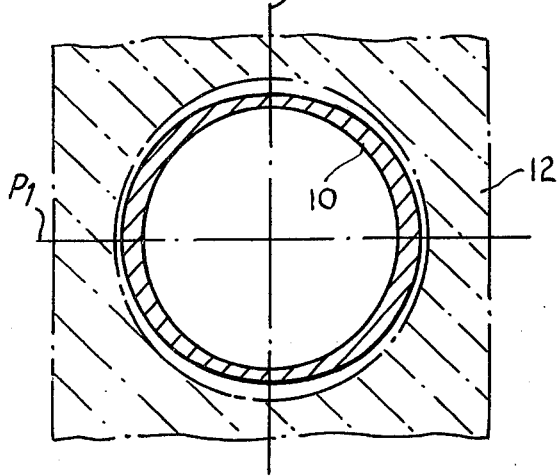
FIG. 2 is a cross-section elevation taken along the line A—A in FIG. 1.

The piston pivoting plane indicated in FIGS. 2 and 3 at $P_1$ is disposed at right angles to the plane $P_2$ containing the longitudinal axis of the cylinder sleeve and the axis of the gudgeon pin 15 which secures the piston 14 to the little end of the connecting rod 17. The sleeve wall increases in thickness symmetrically from the plane $P_2$ towards the piston pivoting plane $P_1$. As shown in FIGS. 2 and 3 the wall increases gradually from the plane $P_2$. However, in other embodiments the increase may occur over a region 60° from each side of the piston pivoting plane $P_1$ (see FIG. 3). In some cases a region of 30° to each side of the plane $P_1$ is sufficient (see again FIG. 3).

I claim:

1. In a cylinder sleeve for a liquid-cooled combustion engine of the reciprocating piston type having a cylinder and a piston for reciprocation therein within said sleeve along the longitudinal axis thereof, said piston pivoting in a plane about a pivot pin carried by a connecting rod, the improvement in which sleeve wall thickness increases in a rotationally symmetrical manner along its periphery towards lines of intersection of the plane of piston pivoting with the wall of said cylinder sleeve.

2. A cylinder sleeve in accordance with claim 1, in which the wall increases in thickness in zones adjacent said pivoting plane and on both sides thereof to a peripheral range of about 30°.

3. A cylinder sleeve in accordance with claim 1, in which the wall increases in thickness in zones extending from about 60° on each side of said plane.

4. In a liquid cooled internal combustion engine having a cylinder block (12) having a bore (11) therein, a sleeve (10) fitting within the bore, an annular space (13) in the cylinder block surrounding the sleeve, a piston (14) sliding within the sleeve, a connecting rod (17), a gudgeon pin (15) connecting the piston to the connecting rod, the improvement which consists in that the thickness of the wall of the sleeve increases symmetrically towards the lines of intersection with the sleeve by a first plane which contains the longitudinal axis of the sleeve and which first plane is at right angles to a second plane which contain both the longitudinal axis of the sleeve and the axis of said gudgeon pin.

5. An internal combustion engine as claimed in claim 4 wherein the thickness of the sleeve increases from said lines of intersection over a peripheral range of about 30° on each side of each of said lines.

6. An internal combustion engine as claimed in claim 4 wherein the thickness of the sleeve increases from said lines of intersection over a peripheral range of about 60° on each side of each of said lines.

* * * * *